(12) United States Patent
Torkkeli (10) Patent No.: US 10,281,718 B2
(45) Date of Patent: May 7, 2019

(54) SCANNING MEMS REFLECTOR SYSTEM

(71) Applicant: MURATA MANUFACTURING CO., LTD., Nagaokakyo-shi, Kyoto (JP)

(72) Inventor: Altti Torkkeli, Tuusula (FI)

(73) Assignee: MURATA MANUFACTURING CO., LTD., Nagaokakyo-Shi, Kyoto (JP)

(*) Notice: Subject to any disclaimer, the term of this patent is extended or adjusted under 35 U.S.C. 154(b) by 0 days.

(21) Appl. No.: 15/682,949

(22) Filed: Aug. 22, 2017

(65) Prior Publication Data

US 2018/0059406 A1 Mar. 1, 2018

(30) Foreign Application Priority Data

Aug. 24, 2016 (FI) .................................. 20165626

(51) Int. Cl.
*G02B 26/10* (2006.01)
*G02B 26/08* (2006.01)
*G01S 7/481* (2006.01)

(52) U.S. Cl.
CPC .......... *G02B 26/105* (2013.01); *G01S 7/4817* (2013.01); *G02B 26/0858* (2013.01); *G02B 26/101* (2013.01)

(58) Field of Classification Search
CPC .......... G02B 26/0858; G02B 26/101; G02B 26/105; G01S 7/4817
USPC .......................................... 359/200.8, 214.1
See application file for complete search history.

(56) References Cited

U.S. PATENT DOCUMENTS

| 6,735,004 | B1 | 5/2004 | Hagelin et al. |
| 8,830,551 | B2* | 9/2014 | Kitazawa ............... H02N 1/006 359/224.1 |
| 10,133,059 | B2* | 11/2018 | Van Biesen .......... G02B 7/1828 |
| 2002/0135850 | A1 | 9/2002 | Hagelin et al. |
| 2006/0227409 | A1 | 10/2006 | Pardo et al. |
| 2007/0171500 | A1 | 7/2007 | Jeong et al. |
| 2008/0285103 | A1 | 11/2008 | Mizumoto |

(Continued)

FOREIGN PATENT DOCUMENTS

| CN | 101852917 B | 10/2010 |
| JP | 2011150055 A | 8/2011 |
| WO | WO 2012/027410 A1 | 3/2012 |

(Continued)

OTHER PUBLICATIONS

Ulrich Hofmann et al., "Wafer-level vacuum packaged resonant micro-scanning mirrors for compact laser projection displays", Proc. SPIE, Feb. 21, 2008, vol. 6887, pp. 688706-1 to 688706-15.*

(Continued)

*Primary Examiner* — Frank G Font
(74) *Attorney, Agent, or Firm* — Squire Patton Boggs (US) LLP (57) ABSTRACT

The actuation range obtained with a bending piezoelectric actuator in MEMS mirror system is mechanically amplified by fixing the moving end of the actuator to a suspender which suspends a reflector from a frame. The fixing point lies somewhere between the two ends of the suspender. The actuator and the suspender together form an actuator unit with a greater actuation range than one actuator can obtain by itself. In one embodiment, the suspender is a rigid lever. In another embodiment, the suspender is another bending actuator so that an additional increase in the actuation range can be obtained from the actuating movement of the second actuator.

17 Claims, 10 Drawing Sheets

(56) References Cited

U.S. PATENT DOCUMENTS

| | | | |
|---|---|---|---|
| 2010/0195180 A1* | 8/2010 | Akanuma | G02B 26/0858 359/200.8 |
| 2010/0309536 A1* | 12/2010 | Akanuma | G02B 26/0858 359/200.8 |
| 2011/0080627 A1 | 4/2011 | He et al. | |
| 2012/0236379 A1* | 9/2012 | da Silva | G01S 7/4817 359/200.8 |
| 2012/0320379 A1 | 12/2012 | Hofmann et al. | |
| 2013/0063800 A1* | 3/2013 | Naono | G02B 26/0858 359/200.8 |
| 2013/0258432 A1* | 10/2013 | Aimono | G02B 26/10 359/200.8 |
| 2015/0309307 A1* | 10/2015 | Naono | B81B 3/0043 359/200.8 |

FOREIGN PATENT DOCUMENTS

| | | |
|---|---|---|
| WO | WO 2015/075222 A1 | 5/2015 |

OTHER PUBLICATIONS

Machine translation of CN 101852917 A from https://worldwide.espacenet.com performed on Aug. 8, 2018.*

Finnish Search Report dated Feb. 23, 2017 corresponding to Finnish Patent Application No. 20165626.

Sven T.S. Holmstrom et al., "MEMS Laser Scanners: A Review," Journal of Microelectromechanical Systems, vol. 23, No. 2, Apr. 2014, pp. 259-275.

J. Minase et al., "A review, supported by experimental results, of voltage, charge and capacitor insertion method for driving piezoelectric actuators," Precision Engineering, vol. 34, No. 4, 2010, pp. 692-700.

Ulrich Hofmann et al., "Resonant biaxial 7-mm MEMS mirror for omnidirectional scanning," Journal of Micro/Nanolithography, MEMS, and MOEMS 13(1), 011103, Jan.-Mar. 2014.

European Search Report application No. EP 17 18 4385 dated Nov. 20, 2017.

* cited by examiner

SCANNING MEMS REFLECTOR SYSTEM

FIELD OF THE DISCLOSURE

This disclosure relates to microelectromechanically actuated scanning reflectors.

BACKGROUND

Prior art document WO2015075222 discloses a scanning MEMS reflector applicable in LIDAR applications and actuated by piezoelectric elements. In the disclosed solution, piezoelectric actuators are fixed to the edge of a reflector with springs. The vertical displacement created by the piezoelectric actuators is transferred directly to the edge of the reflector. As seen in FIG. 4 in document WO2015075222, a problem with this prior art solution is that the actuation units (3) require a very large surface area to be able to generate a sufficient actuation range. The reflector 1 occupies only a small area in the middle of the device. The large chip size required of the scanning MEMS reflector disclosed in WO2015075222 limits its versatility.

US2006227409 and US2007171500 are two prior art documents where mechanical amplification has been utilized to increase the tilt amplitude of MEMS reflectors. However, both of these prior-art solutions for mechanical amplification require a great deal of surface area. They cannot be used with large-area reflectors and they require a large chip size even for small-area reflectors. Furthermore, neither of them can generate wobbling-mode oscillation.

DETAILED DESCRIPTION

Scanning microelectromechanical (MEMS) reflectors can be used in imaging devices such as light-detecting and ranging sensors (LIDARs). A scanning MEMS reflector may contain at least one moving reflector which can reflect light beams from a laser emitter towards the surrounding environment. Additional fixed reflectors may be included in the light path between the moving reflector and the environment. Returning light beams can be reflected inward towards a photodetector by the same fixed reflectors and moving reflector which reflected the outgoing beam.

Figure 1:
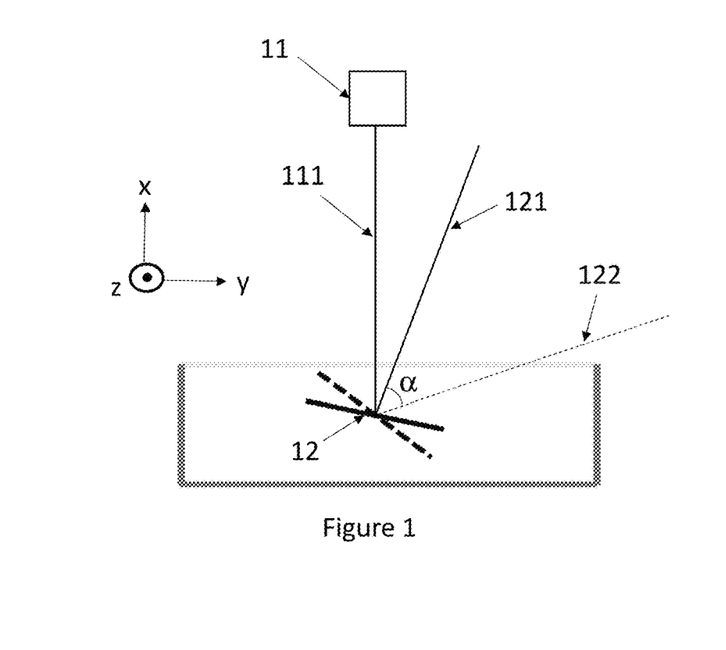
FIG. 1 shows a simplified sketch of a scanning MEMS reflector undergoing tilting mode oscillation.

The imaging area (i.e. the field of view) of a scanning MEMS reflector is in part determined by how much the moving reflector can be tilted. This is illustrated in FIG. 1, which shows a simplified two-dimensional sketch of a reflector system. A laser emitter 11 emits a light beam 111. Moving reflector 12 is suspended from a torsion beam and can be rotated about the z-axis. The reflector 12 is shown with a solid line in the position where it has rotated to its counter-clockwise extremity. The light beam 121 reflected from this position is also shown with a solid line. The reflector 12 is shown with a dashed line in the position where it has rotated to its clockwise extremity. The light beam 122 reflected from this position is also shown with a dashed line. With a suitable arrangement of fixed reflectors (not shown in FIG. 1), the light beams 121 and 122 can, for example, be projected in a direction parallel to the y-axis. In this simplified sketch, the imaging area of the reflector would be determined by the angle α between the two beams 121 and 122 and by the arrangement of the fixed reflectors (not shown). As seen in FIG. 1, the magnitude of α is determined by the range of tilt angles which the reflector 12 can obtain.

In some scanning reflectors the imaging area extends both to the right and left of laser emitter 11 in FIG. 1. In this case the counter-clockwise rotational extremity of reflector 12 about the z-axis must extend so far that beam 121 is reflected in a leftward direction in FIG. 1. The imaging area of the scanning reflector will again depend on the angle α between beams 121 and 122 and on how the fixed reflectors are arranged around and above the moving reflector 12.

The motion described above is oscillating rotation of the reflector about one axis, the z-axis in FIG. 1. This will be called tilting mode oscillation in this disclosure. The scanning motion in tilting mode oscillation consists of only one line scan and is restricted to one layer of the xy-plane in FIG. 1.

If a scanning motion through multiple layers is required, the light beam 111 has to be reflected out of the xy-plane in FIG. 1. This can be achieved with a so-called wobbling reflector. A wobbling reflector is not attached to rotation axes, but it undergoes movement which mimics rotation about two axes. This wobbling movement involves lifting and sinking of the various reflector sides in a suitably coordinated and timed order.

Figure 2:
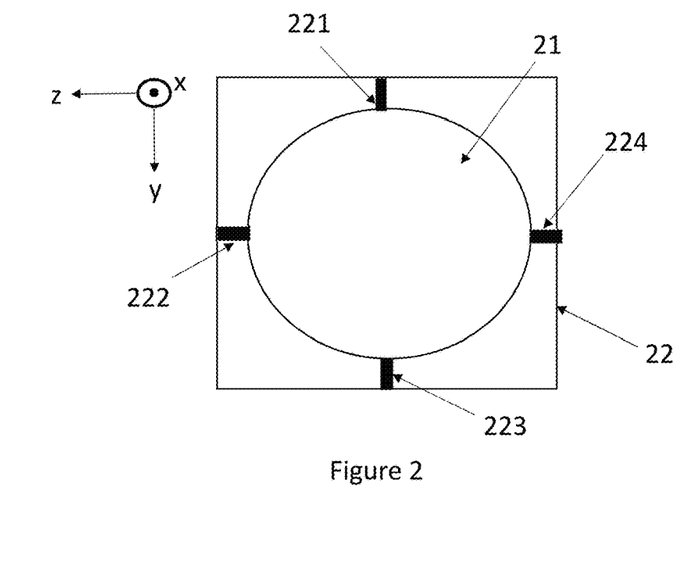
FIG. 2 shows a simplified sketch of a scanning MEMS reflector constructed for wobbling mode oscillation.

Wobbling motion can be generated with the system which is schematically illustrated in FIG. 2. It shows a circular reflector 21 in the yz-plane. This reflector 21 is suspended from a frame 22 by four actuators 221, 222, 223 and 224, fixed in symmetrically located positions around the edge of the reflector 21. Each actuator is controlled by a voltage and each actuator can lift the reflector edge upwards or sink it downwards at the point where the actuator is fixed to the edge.

By coordinating the lifting and sinking movements of each actuator suitably, the reflector surface can be tilted away from the yz-plane in any direction. For example, if actuator 224 is lifts the edge to which it is fixed, while actuator 222 sinks the edge to which it is fixed, and both 221 and 223 keep the edges to which they are fixed in a middle position, then the reflector movement mimics tilting about the y-axis. If actuator 221 lifts while 223 sinks, and both 222 and 224 stay in a middle position, then the reflector movement mimics tilting about the z-axis. If actuators 222 and 221 lift while 223 and 224 sink, the reflector movement mimics a combined tilt about both the y- and the z-axis.

With suitably timed and coordinated actuation, the reflected beams 121 and 122 can thereby be made to circle around the x-axis as the reflector undergoes wobbling motion. The imaging area of the scanning reflector then approximates a 360° circular projection of the angle α, shown in FIG. 1, around the x-axis. This scanning motion will be called wobbling mode oscillation in this disclosure.

In both tilting and wobbling mode oscillation, the reflector motion has a certain tilt amplitude in relation to a rest position. If the rest position of the reflector is flat in the yz-plane in FIG. 1, then the tilt amplitude is the angle between the x-axis and the surface normal of the reflector when the reflector has been tilted as much as possible. Tilt amplitude is an important design parameter in scanning MEMS reflectors.

The reflector motion also has a certain tilt oscillation frequency at which the actuator motion is driven. In LIDAR applications this frequency may be in the range 0.5 kHz-5 kHz.

A second important design parameter in MEMS reflectors is the optical area of the reflector itself. Some of the emitted light beams return toward the scanning MEMS reflector after being reflected back by objects in its surrounding environment. A reflector with a large optical area captures these returning light beams more effectively than a small one because it transmits a greater amount of incoming light from the environment to the photodetector. An increase in optical area allows more distant objects to be recognized. The optical area therefore has a significant effect on the range of a LIDAR scanner.

In this disclosure the term "actuator" refers to a piezoelectric or capacitive component which undergoes physical displacement (usually bending or translation) in response to a voltage applied to the component. An actuator can be used to drive oscillating movement when it is controlled with a periodic AC voltage signal. A bending piezoelectric actuator for a scanning MEMS reflector may include a silicon layer coated with piezoelectric layers and conductive layers which transmit the voltage signal to the piezoelectric layers. An approximately 50 µm thick layer of silicon is sufficiently thin to bend with the piezoelectric material when a voltage is applied. In this disclosure the term "actuation unit" refers to an actuator combined either with a rigid lever or with an additional actuator.

A "rigid lever" in a scanning MEMS reflector may be an elongated silicon beam. It often has the same thickness as the silicon layer in the bending piezoelectric actuator since they are prepared in the same process. This means that in this disclosure the term "rigid lever" does not indicate that the lever is robust on any absolute scale of rigidity. The adjective "rigid" is used as a counterpoint to the adjective "bending". In other words, the term "rigid lever" indicates that the silicon beam which constitutes the lever will bend much less than a "bending piezoelectric actuator" does when an actuation unit is actuated. The silicon beam which constitutes a "rigid lever" may bend to some degree when the actuator drives it up and down, but the degree of bending in this beam will be less than the maximum degree of bending in any actuator described in this disclosure.

In this disclosure the term "actuation system" refers to a combination of several, separately controlled actuation units. The term "actuation range" refers to the maximum displacement that a given actuation unit can generate in one direction away from its rest point. Most actuators can generate the same maximum displacement in two opposite directions.

The actuation unit which sets the reflector in motion may be fixed to a fixing point at the edge of the reflector. If the actuation range of the actuator is D, the tilt amplitude is β and the radius of the reflector is R, then the relation between the three is D=R·tan (β). Therefore, if the diameter of a circular reflector in a scanning MEMS reflector is, for example, 4 mm, then a tilt amplitude of 15° (i.e. tilt oscillation±15° from the rest position) requires that the actuation unit must displace the edge more than 500 µm in both directions from its rest position. This is a large displacement.

Scanning MEMS reflectors can employ piezoelectric or electrostatic actuators. The forces generated by both types of actuators are weak, but the resulting tilt amplitude (and reflector displacement) can be increased by various methods. One way to increase tilt amplitude is to drive the reflector tilt oscillation at a frequency which corresponds to a resonance mode. This resonance gain can be most effectively utilized if the gas pressure around the moving reflector is low. In such applications the package containing the reflector may have to be sealed from the surrounding environment. Another way to increase tilt amplitude is to utilize mechanical amplification. Actuation units for mechanical amplification will be described in the present disclosure. Mechanical amplification can advantageously be combined with resonance gain.

The principle of mechanical amplification presented in this disclosure can be implemented with both capacitive and piezoelectric actuators, but a capacitive implementation is more complex. A capacitive actuation unit could, for example, be based on parallel-plate capacitive actuators with one electrode plate placed on a silicon beam and the other above or below it, separated by a vertical gap. However, the amplitude of the vertical motion generated by this capacitive actuator is limited by the separation gap, which must be on the order of a few µm. Another alternative is to use comb-type capacitive actuators, as in prior art document Hofmann et al. *Resonant Biaxial 7-mm MEMS Mirror for Omnidirectional Scanning* (Journal of Micro/Nanolithography, MEMS, and MOEMS 13(1), 011103 (January-March 2014)). However, comb-type actuation cannot be easily integrated with silicon beams without significantly increasing the surface area of the actuation system.

This disclosure therefore focuses on bending piezoelectric actuators. Out-of-plane bending piezoelectric actuators generate force in the direction of their displacement throughout their oscillating back-and-forth motion. They are well-suited for controlled mechanical amplification because piezoelectric thin films and their electrical connectors can be integrated to bending silicon beams and adapted to the shape of the beams so that the actuation units do not require any additional, dedicated chip area. This will be illustrated in more detail below.

The present disclosure relates to a piezoelectric actuation mechanism for scanning MEMS reflectors.

In the present disclosure, mechanical amplification is used to increase the actuation range of piezoelectric actuation units.

SUMMARY

An object of the present disclosure is to provide an apparatus and an associated method for overcoming the above problems. In particular, the object of the present disclosure is to present an actuator system for scanning MEMS reflectors wherein an improved actuation range can be obtained on a small surface area.

The objects of this disclosure are achieved by an apparatus and a method which are characterized by what is stated in the independent claims. The preferred embodiments of the disclosure are disclosed in the dependent claims.

This disclosure is based on the idea of mechanically amplifying the actuation range of a bending piezoelectric actuator by fixing the moving end of the actuator to a suspender which suspends a reflector from a frame. This fixing point lies somewhere between the two ends of the suspender. The actuator and the suspender together form an actuator unit with greater actuation range than one actuator can obtain by itself. In one embodiment, the suspender is a rigid lever. In another embodiment, the suspender is another bending actuator and an additional increase in tilt amplitude is obtained from the actuating movement of this second actuator. Three embodiments of this idea will be described below.

An advantage of the apparatus and method of this disclosure is that a reflector with a large surface area can be driven into tilt oscillation with a large tilt amplitude by an actuation system with a small surface area. The increased actuation range can, for example, be utilized to relax the resonance-based design requirements pertaining to low gas pressure in the reflector cavity, or simply to increase the imaging area of the scanning MEMS reflector. Another important benefit is that less effective piezoelectric materials such as aluminium nitride can be used instead of highly effective, but environmentally unfriendly materials such as PZT (Lead Zirconate Titanate) or other lead compounds.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Three embodiments are described below. Each embodiment includes a scanning microelectromechanical reflector system comprising a frame, a reflector and at least one actuation unit, wherein each actuation unit comprises an actuator and a suspender. The suspender is fixed from a first fixing point to the frame, from a second fixing point to the reflector and from a third fixing point to the actuator. When the third fixing point is projected onto a line extending through the first fixing point and the second fixing point, the projection of the third fixing point lies between the first fixing point and the second fixing point.

Figure 12:
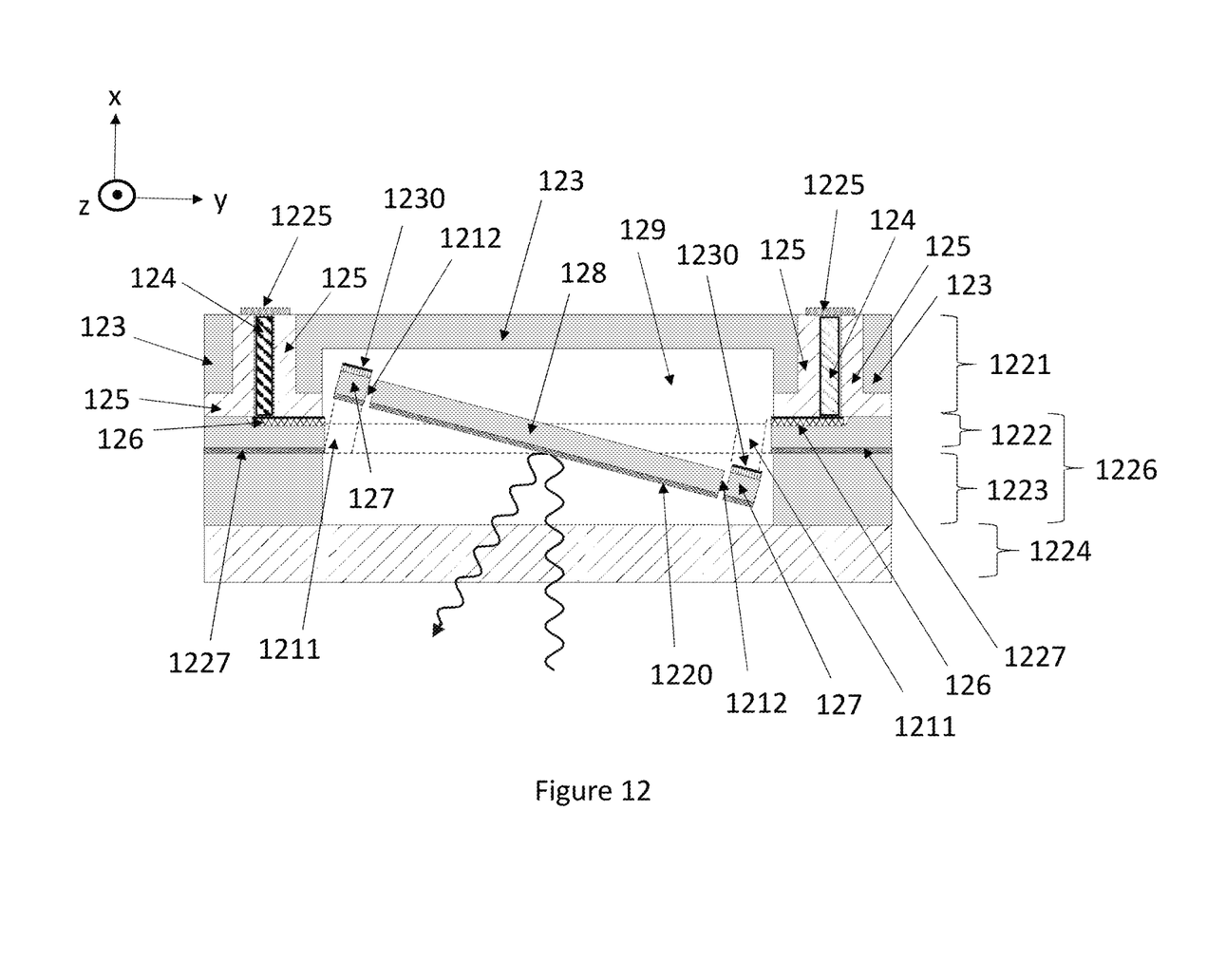
FIG. 12 is a schematic cross-section of a scanning MEMS reflector device according to any of the three embodiments.

Throughout this disclosure, the reflector may comprise a silicon plate coated with a reflective coating. The coating may, for example, include one or more metal thin film layers, such as aluminium, silver, gold or copper films. Alternatively, the coating may comprise a stack of one or more dielectric films with different refractive indexes, where the films are arranged so that the stack reflects light. The rigid lever suspenders can be silicon beams formed from the same silicon substrate as the reflector plate. The bending piezoelectric actuators can be silicon beams, also prepared from the same silicon substrate but coated with a piezoelectrically active layer such as aluminium nitride to facilitate actuation movement. The bending piezoelectric actuator is also coated with metal electrode layers on two sides of the piezoelectrically active layer so that the actuation movement can be controlled by voltage signals. The electrodes may, for example, be prepared from molybdenum, aluminium or titanium. The electric interconnections of the scanning MEMS reflector device are illustrated in FIG. 12 below.

In this disclosure, the term "frame" means a mechanical part which surrounds the actuation system and reflector and supports their weight. The frame itself may be fixed to much larger parts in the surrounding MEMS scanning reflector device, as indicated in FIG. 12. The frames presented in the embodiments below are rectangular, but the same actuation amplification principle could be implemented also with differently shaped frames.

The term "suspender" means a mechanical part between the frame and the reflector. The reflector is attached to the frame with suspenders, and both the suspenders and the reflector are mobile in relation to the frame. A suspender supports the weight of the reflector, but it also moves the reflector in relation to the frame when the actuation unit is activated. The reflector may be supported from the frame by other elements as well, such as a torsion bar. However, a torsion bar does not classify as a suspender in this disclosure because it does not move the reflector (it imparts no motion to the reflector, it merely allows torsional motion). Suspenders can be implemented either as rigid levers or as bending piezoelectric actuators.

The first embodiment relates to tilting mode oscillation achieved with actuation units that comprise bending actuators and rigid lever suspenders. In this embodiment the reflector is supported from the frame by suspenders and by a torsion bar.

The second embodiment relates to wobbling mode oscillation, also achieved with actuation units that comprise bending actuators and rigid lever suspenders. In this embodiment the reflector is attached to the frame only with suspenders.

The third embodiment relates to actuation units comprising interconnected bending actuators, which can be used in combination with either of the first two embodiments.

Figure 3:
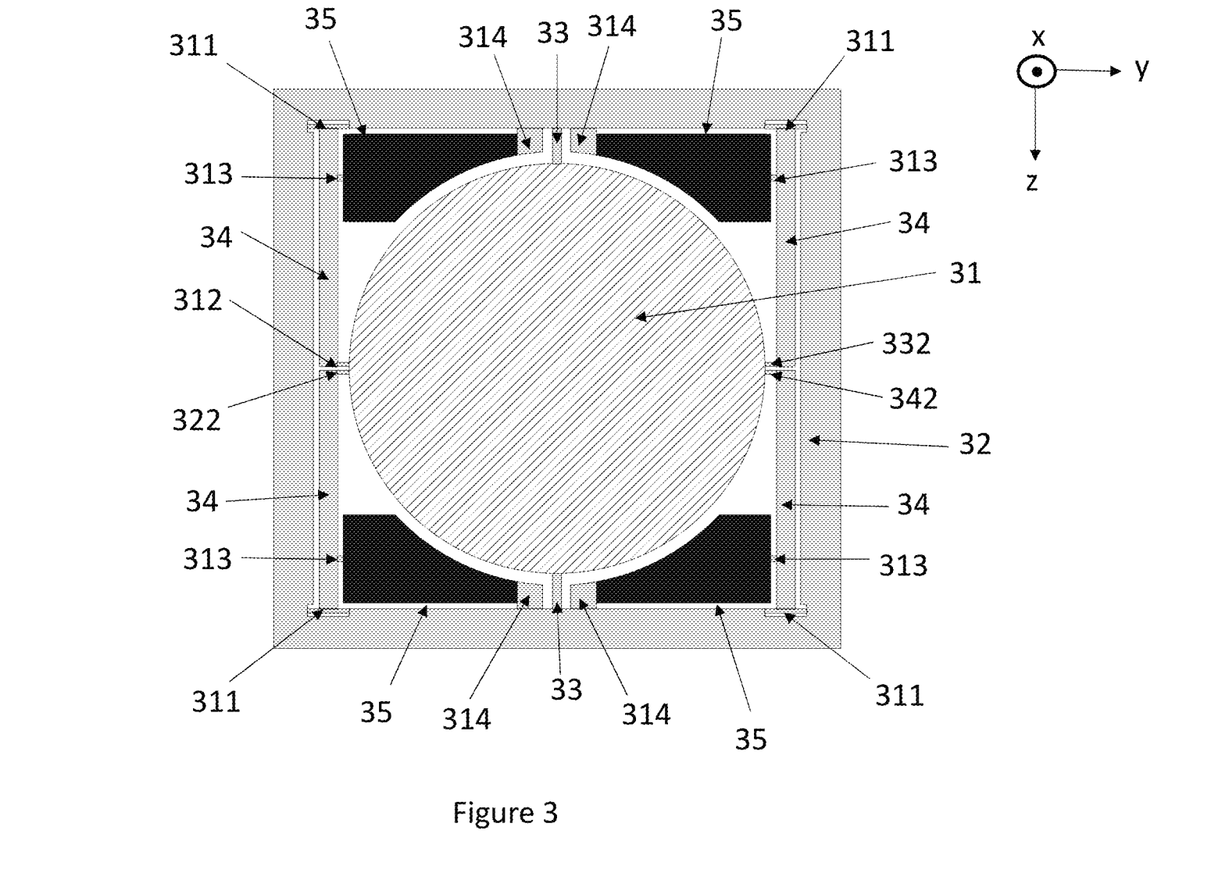
FIG. 3 shows a scanning MEMS reflector system according to a first embodiment.

An actuation system for a scanning MEMS reflector according to the first embodiment is illustrated in FIG. 3. It shows a reflector 31 with a circular shape, surrounded by a frame 32. The reflector 31 is fixed to the frame 32 from a torsion beam 33 which allows tilting mode oscillation of the reflector 31 about the z-axis. As shown in FIG. 3, a first pair of opposing edges of the reflector is fixed to the frame 32 from the torsion beam 33. The torsion beam can, for example, consist of a pair of silicon bridges which are suitably narrow in the y-direction and suitably thin in the x-direction to allow reflector 31 to twist about the z-axis when the reflector is actuated into oscillating motion. The torsion beam must be sufficiently robust to withstand the strain generated in this twisting movement. The optimal dimensioning of the torsion bar will depend on the dimensions and mass of the reflector and the intended oscillation amplitude.

The actuation system shown in FIG. 3 comprises four actuation units, two on the left hand side of torsion beam 33 in FIG. 3, and two on the right hand side. In this disclosure the terms "left" and "right" refer to the orientation seen in FIGS. 3, 6-9 and 11, where an object in the yz-plane on the right hand side has a larger position coordinate on the y-axis than an object in the same plane on the left hand side. The terms "up" and "down", however, refer to distances and movement on the x-axis, not the z-axis. In other words, the terms "up" and "down" refer to movements out of the yz-plane depicted in FIGS. 3, 6-9 and 11.

A first pair of opposing edges of the reflector 31 is fixed to the frame from the torsion beam 33. A second pair of opposing edges of the reflector 31 is fixed the frame from at least two actuation units. Each actuation unit comprises a suspender 34 and an actuator 35. Each suspender 34 is fixed to the frame at a first fixing point 311 and to the reflector at a second fixing point. The second fixing points have been marked with 312 and 322 on the left hand side and 332 and 342 on the right hand side. Each suspender 34 is a rigid lever.

With regard to the term "fixing point" in this disclosure, it is seen in FIGS. 3, 6-9 and 11 that different fixing structures can be implemented at each fixing point. The fixing structures located at second fixing points 312, 322, 332 and 342 may be implemented as narrow silicon bridges extending from one side of a suspender 34 to the reflector 31. Similarly, the fixing structures located at third fixing points 313 may be implemented as narrow silicon bridges extending from one side of a suspender 34 to the actuators 35. The fixing structures located at first fixing points 311, on the other hand, may be implemented as narrow silicon bridges extending from both sides of a suspender 34 to the frame 32, as shown in FIG. 3. When the fixing structure(s) at a given fixing point are too large to be considered point-like, the location of the fixing point may be assigned to the geometric center of the fixing structure(s) at this fixing point.

Narrow bridges are suitable fixing structures at the first, second and third fixing points because they conform to the twisting movement which up-and-down actuation generates in the fixing structures located at these fixing points. The fixing structures located at fourth fixing points 314, on the other hand, should be rigid enough to keep the fixed end of the actuator 35 in place when it bends. These fixing structures may be implemented as a broad bridge extending from the actuator 35 to the frame 32, as illustrated in FIG. 3. Alternatively, the fixing structures at the fourth fixing points may be implemented as narrow extensions of the frame 32 to the actuators 35. The frame is much thicker in the x-direction than the moving components of the scanning MEMS reflector, so even a narrow extension of the frame 32 can be sufficiently rigid to fix one end of an actuator 35.

The first, second and third fixing points do not have to be arranged in a straight line to generate the actuation motion described in this disclosure. In all three embodiments, a sufficient condition for implementing the apparatus and method of the present disclosure is that the projection of the third fixing point onto a line extending through the first fixing point and the second fixing point lies between the first fixing point and the second fixing point.

For example, the suspenders 34 in FIG. 3 are quite narrow beams. In the illustrated embodiment, the three fixing points 311, 312 and 313 are arranged approximately in a straight line and substantially in the same yz-plane (although the thickness of the fixing structures at these fixing points could be varied if different mechanical properties are sought at each fixing point). However, the suspenders 34 could also have a wider shape where the y-coordinates of the third fixing points 313 would differ from the y-coordinates of the corresponding first and second fixing points 311 and 312. Alternatively, the third fixing points 313 could lie entirely below the yz-plane in FIG. 3, so that the x-coordinates of the third fixing points 313 would differ from the x-coordinates of the corresponding first and second fixing points 311 and 312.

The actuation described in this disclosure requires that a force pressing the third fixing point up or down (in the x-direction) creates a torque about an axis passing through the fixing structure at the first fixing point, thereby pushing the second fixing point further up or down than the third. This condition is fulfilled whenever a third fixing point is located at such x, y and z coordinates that it can be projected onto a line extending through the corresponding first fixing point and second fixing point so that its projection lies between the first fixing point and the second fixing point.

It is noted with regard to the second pair of opposing edges that the word "opposing" in this case designates merely a general opposition between the left and right hand sides of the reflector in FIG. 3. The fixing points 312, 322, 332 and 342 need not be aligned symmetrically in relation to the torsion beam 33 as in FIG. 3. Furthermore, the fixing points on either edge need not be precisely adjacent to each other as in FIG. 3.

The actuation system according to this first embodiment can be implemented with only one actuation unit on the left side and one on the right side. It can also be implemented with only one actuation unit on the left side and none on the right, or one on the right and none on the left. In this case one pair of opposing edges is fixed to a torsion beam and at least one other part of the edge is fixed to an actuation unit. As above, a lone fixing point can be placed anywhere on the edge, except in the places where the torsion beam is attached.

The actuators 35 are bending piezoelectric actuators. Each actuator 35 is fixed to its corresponding suspender 34 at a third fixing point 313 and to the frame 32 at a fourth fixing point 314. The reflector 31 is actuated into tilting mode oscillation when the pair of actuation units on the left side of torsion beam 33 moves the left reflector edge up/down and the pair of actuation units on the opposite side of the torsion beam 33 simultaneously moves the right reflector edge down/up.

If the piezoelectric material in one or more actuation units fixed to the first edge (left or right) has the same polarity as the piezoelectric material in one or more actuation units fixed the second edge, then this actuation motion can be generated by driving the two actuation unit pairs (left and right) with two voltage signals of opposite polarity. If, on the other hand, the piezoelectric materials in one or more actuation units fixed to the first edge (left or right) have the opposite polarity as the piezoelectric layers in one or more actuation units fixed to the second edge, then the opposing actuation motion described above can be generated by driving the two actuation unit pairs with the same voltage signal.

The polarity of a piezoelectric material determines whether the material will contract or expand along the direction of the electric field. The polarity of piezoelectric materials which are also ferroelectric, such as PZT, can be set in a poling process which involves aligning individual dipole moments inside the material in one direction using an external electric field of the desired polarity. In this case the piezoelectric materials in actuators on opposing sides of the reflector can be poled with opposite polarities. However, non-ferroelectric materials like aluminium nitride cannot be poled because they are self-polarized after deposition. The direction of polarization in these materials is set by process conditions and cannot be changed without major deposition process changes. When such materials are utilized, the piezoelectric materials in all actuators preferentially have the same polarity.

Figure 4:
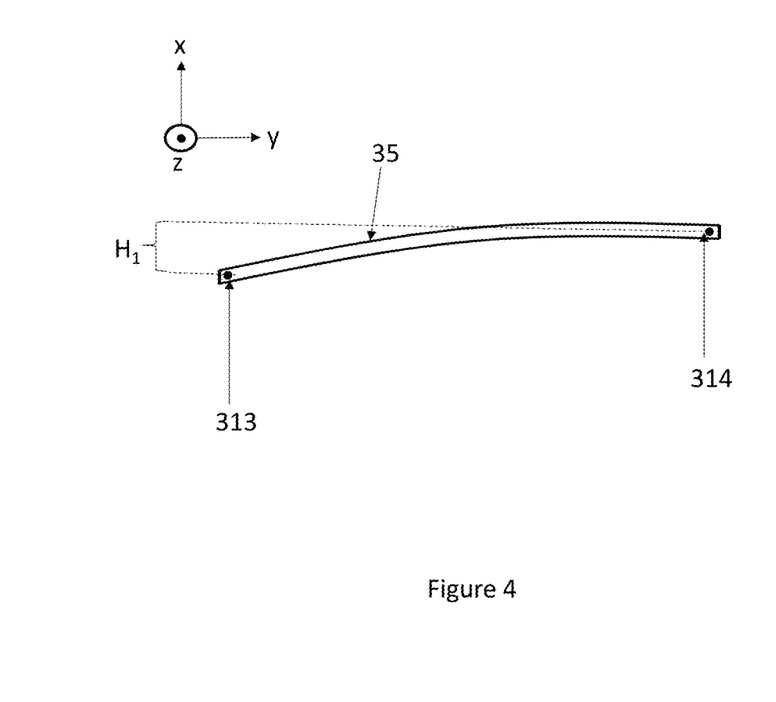
FIG. 4 illustrates the operating principle of the actuation unit in the first, second and third embodiments.

The operating principle of the actuation units shown in FIG. 3 will now be described in more detail with reference to FIGS. 4 and 5. The same operating principle applies in all embodiments where the suspender is a rigid lever. Bending piezoelectric actuator 35 is fixed to the frame at point 314. When a voltage is applied to the actuator, it bends either upward or downward depending on the polarity. Downward bending is illustrated in FIG. 4, but upward bending is also included in each embodiment. As the actuator 35 bends, the fixed end of the actuator remains in place and the opposite end moves downward a distance $H_1$. The third fixing point 313 is located at this moving end of the actuator 35, as shown in FIG. 3.

As can be seen in FIG. 3, actuator 35 can utilize the available surface area in the yz-plane between the reflector 31 and the frame 32. A greater surface area produces a stronger force. The frames illustrated in the figures of this disclosure all have predominantly straight inside edges, with only a small recess at each first fixing point. However, larger recesses could also be prepared on the inside of the frame 32 to accommodate parts of the actuator 35 and/or the suspender 34. Such additional recesses may in some geometries be useful for increasing the surface area of the actuators 35, or for orienting the actuator 35 and/or suspender 34 in a different manner so that more room is available for the reflector.

As also shown in FIG. 3 and discussed above, actuator 35 is fixed to suspender 34 only by a narrow connecting silicon bridge which forms the third fixing point 313. This connecting bridge must withstand the strain generated at fixing point 313, but it must also twist slightly about the y-axis as the suspender 34 is pressed downward. It is therefore preferably implemented as a hinge, which means that the bridge is made high in the x-direction to transmit force effectively from the actuator to the suspender, but narrow in at least one direction in the yz-plane to allow twisting. The fixing points where fixing structures are implemented as hinges also act to some extent as springs, because the narrowness of the connecting bridge makes it flexible in at least one direction.

Actuation unit 36 also includes the suspender 34. FIG. 5 illustrates the movement of the suspender 34 when the actuator 35 bends in the manner illustrated in FIG. 4. Fixing point 313 is pressed downwards by actuator 35, which applies a torque on suspender 34 about the y-axis passing through first fixing point 311. In this embodiment and throughout this disclosure, the fixing structures at the first, second and third fixing points 311, 312 and 313 are preferably implemented as hinges. The fixing structures at the fourth fixing point 314 is preferably implemented with a much broader or thicker connection between the actuator 35 and the frame 32, as explained above.

The torque applied by the actuator 35 on the suspender 34 rotates the suspender about the first fixing point 311. As already mentioned, the suspender 34 is in this embodiment a rigid lever. The opposite end of the suspender, which is fixed to the edge of the reflector at second fixing point 312, therefore moves down and presses the edge of the reflector down.

Figure 5:
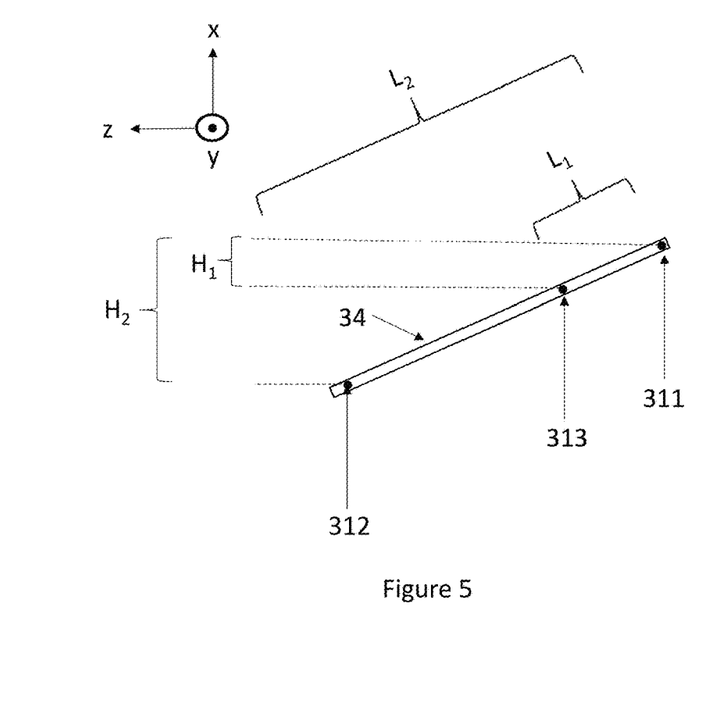
FIG. 5 illustrates the operating principle of the actuation unit in the first and second embodiments.

FIG. 5 illustrates the principle of mechanical amplification in this first embodiment. The total length of suspender 34 is $L_2$. The distance from the first fixing point 311 to the third fixing point 313 is $L_1$. As actuator 35 bends, third fixing point 313 moves downward by a distance $H_1$, as already indicated above. Second fixing point 312 moves downward by a longer distance $H_2$ and thereby amplifies the actuation range achieved by actuator 35. The actuation unit achieves the actuation range $H_2$ even though the actuation range of the actuator 35 alone is only $H_1$.

The third fixing point 313 could be located anywhere between first and second fixing points 311 and 312. A larger value for $L_1$ produces a greater torque about the y-axis passing through first fixing point 311, but it also achieves a smaller actuation range $H_2$ because $H_2 = L_2 \times H_1 / L_1$. A person skilled in the art will be familiar with this consequence of Archimedes' lever principle and can optimize $L_1$ according to need.

Figure 6:
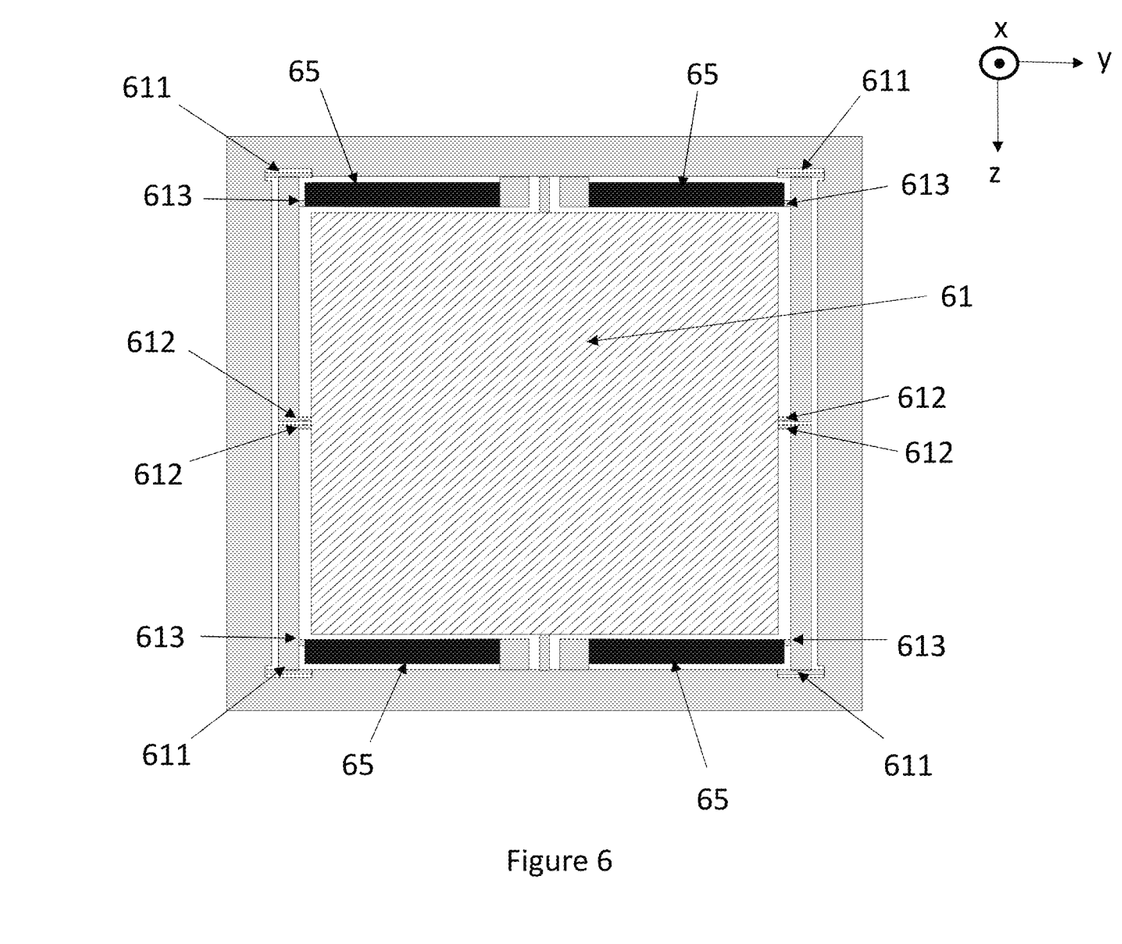
FIG. 6 illustrates a variant of the scanning MEMS reflector system according to the first embodiment.

The first embodiment can also be implemented with a rectangle-shaped reflector, as illustrated in FIG. 6. All components shown in FIG. 6 correspond to the ones illustrated in FIG. 3. It can be seen that the rectangle-shaped reflector limits the surface area of actuators 65 in the yz-plane. Another limitation with a rectangle-shaped reflector is that the third fixing point 613 cannot be placed very far from first fixing point 611 because the reflector 61 extends so far towards the corner of the frame. In other words, the distance $L_1$ is limited by the reflector surface, so the torque generated by actuator 65 may be smaller than when the reflector is circular. However, the optical area of the rectangular reflector 61 is on the other hand larger than that of a circular reflector.

Figure 7:
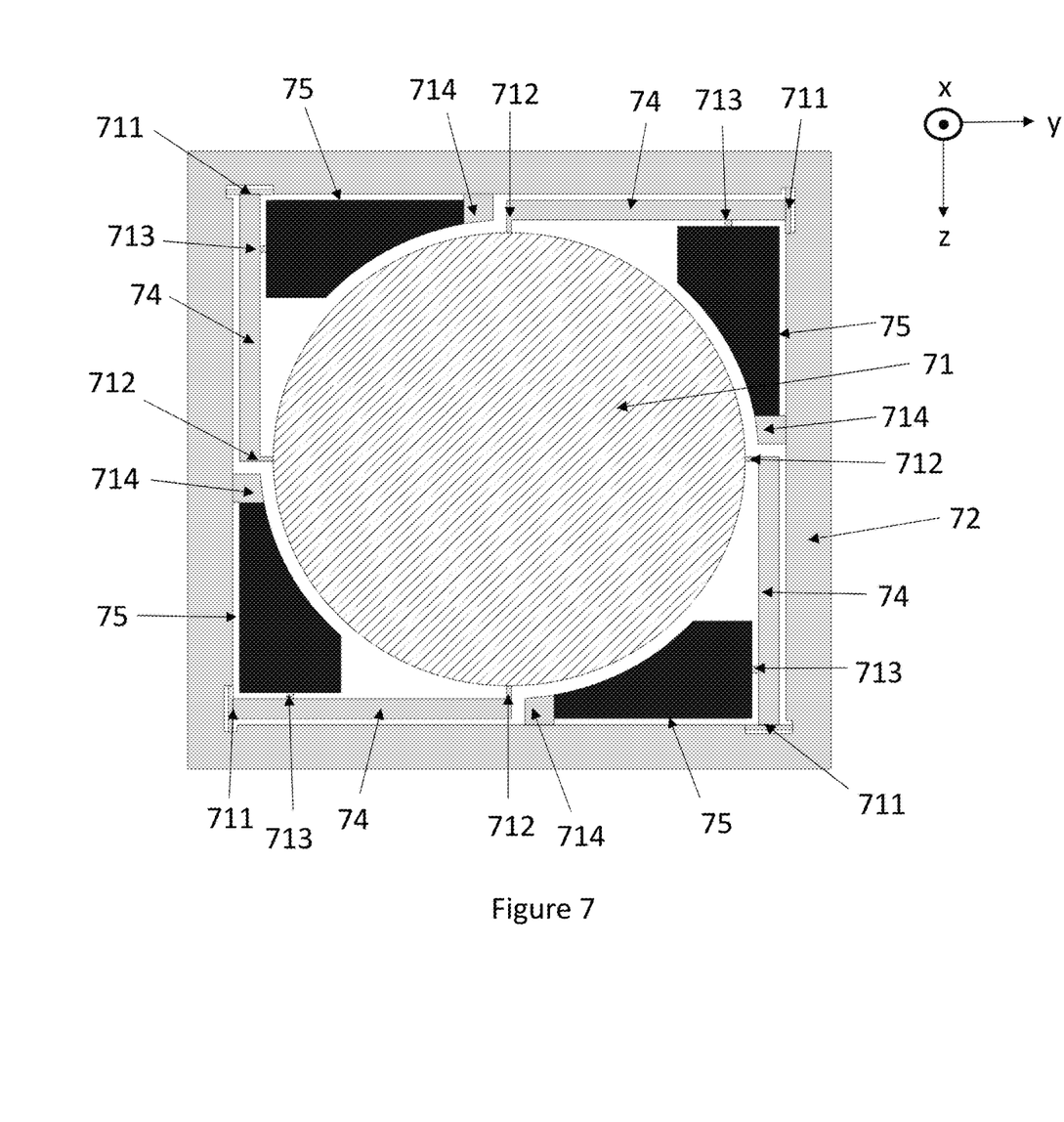
FIG. 7 illustrates a scanning MEMS reflector system according to a second embodiment.

An actuation system for a scanning MEMS reflector according to the second embodiment is illustrated in FIG. 7. It shows a reflector 71 with a circular shape, surrounded by a frame 72. To facilitate wobbling mode oscillation, the actuation system comprises four actuation units placed symmetrically around the reflector 71. The reflector is fixed to these four actuation units at four fixing points placed symmetrically around the edge of the reflector.

Each actuation unit comprises a suspender 74 and an actuator 75. Each suspender 74 is fixed to the frame at a first fixing point 711 and to the reflector at a second fixing point 712. Each suspender 74 is a rigid lever. In contrast to the first embodiment depicted in FIG. 3, second fixing points 712 are in this embodiment distributed around the edge of the reflector 71, as shown in FIG. 7. The general considerations which concerned the structure and geometry of fixing points in the first embodiment apply to this second embodiment as well.

The actuators 75 are bending piezoelectric actuators. Each actuator 75 is fixed to a corresponding suspender 74 at a third fixing point 713 and to the frame at a fourth fixing point 714. One suspender—actuator pair constitute an actuation unit, as already indicated. The reflector is actuated into wobbling mode oscillation when the four actuation units move their respective second fixing point 712 up and down in a suitably coordinated and synchronized order.

Figure 8:
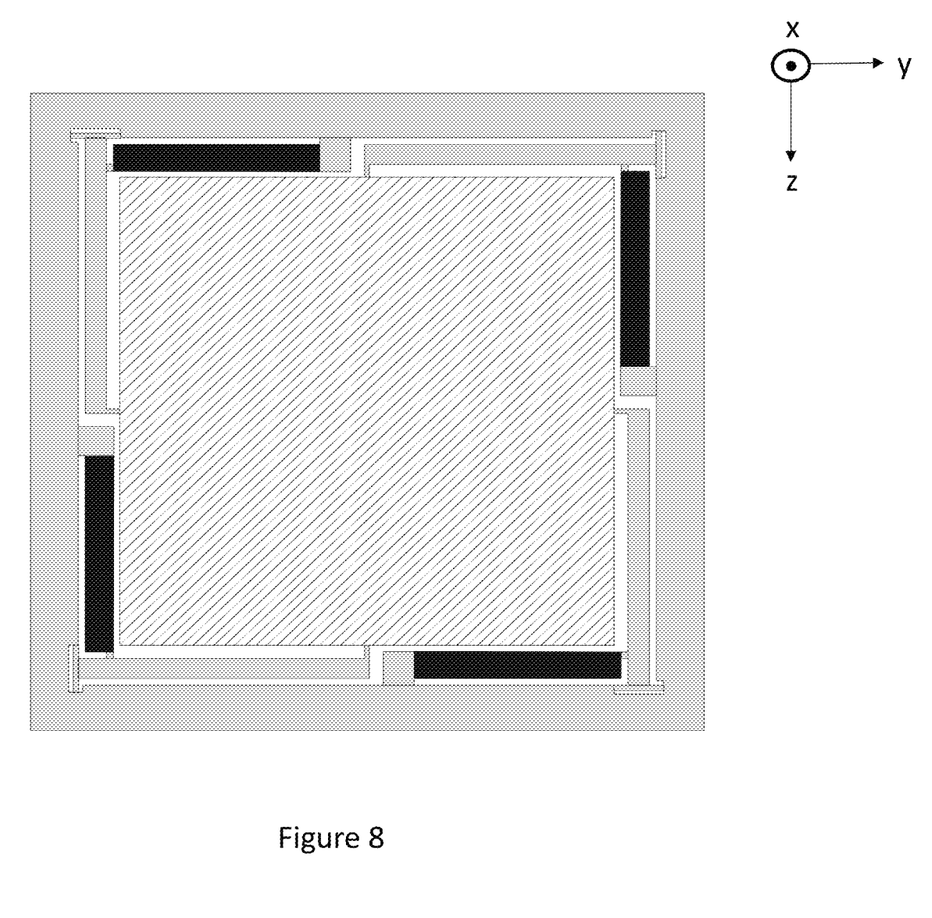
FIG. 8 illustrates a variant of the scanning MEMS reflector system according to the second embodiment.

The wobbling-mode oscillation of this second embodiment can also be implemented with a rectangular reflector, as illustrated in FIG. 8. All components shown in FIG. 8 correspond to the ones illustrated in FIG. 7. Only the shape of the reflector and actuator is different. As in the first embodiment, a rectangle-shaped reflector limits both the surface area of the actuators and the distance $L_1$, but its optical area is larger than that of a circular reflector.

Wobbling mode oscillation does not necessarily require that there must be exactly four second fixing points (and four actuation units), nor that the second fixing points must be arranged in exact symmetry on the reflector edge (for example at the 0°, 90°, 180° and 270° locations shown in FIG. 7). A sufficient condition for achieving wobbling-mode oscillation is that the reflector is fixed to at least three actuation units at fixing points placed apart from each other anywhere on the edge of the reflector.

Four actuation units and second fixing points surrounded by a rectangular frame are illustrated in FIGS. 7 and 8. The number of actuation units (and corresponding fixing points) within a rectangular frame can be varied. Alternatively, three actuation units could be implemented if the frame is a triangle, five if the frame is a pentagon, six if the frame is a hexagon, and so on. If the shape of the reflector is circular or corresponds to the shape of the frame, the same actuation unit geometries which are illustrated in the figures of this disclosure can be implemented even in triangular, pentagonal and other frame geometries (only the angle between the actuator and the suspender changes). However, there is no necessary connection between the shape of the frame and the number of actuation units, so the number of actuation units can also be smaller or greater than the frame symmetry number.

Synchronized wobbling-mode actuation can for instance be generated by driving the four actuation units in FIGS. 7 and 8 with four separate voltage signals, each signal being separated by a 90° phase shift from the previous one. In more general terms, if the number of actuation units is n, if they are placed symmetrically around the edge of the reflector and if each one is driven with a separate voltage signal, then each voltage signal may be separated by a 360°/n phase shift from the previous one. The mechanical amplification of the actuation movement is obtained in the same manner as in the first embodiment described above. The amplification increases the actuation range (and thereby the tilt amplitude) in the same manner in wobbling mode oscillation as in tilting mode oscillation.

Figure 9:
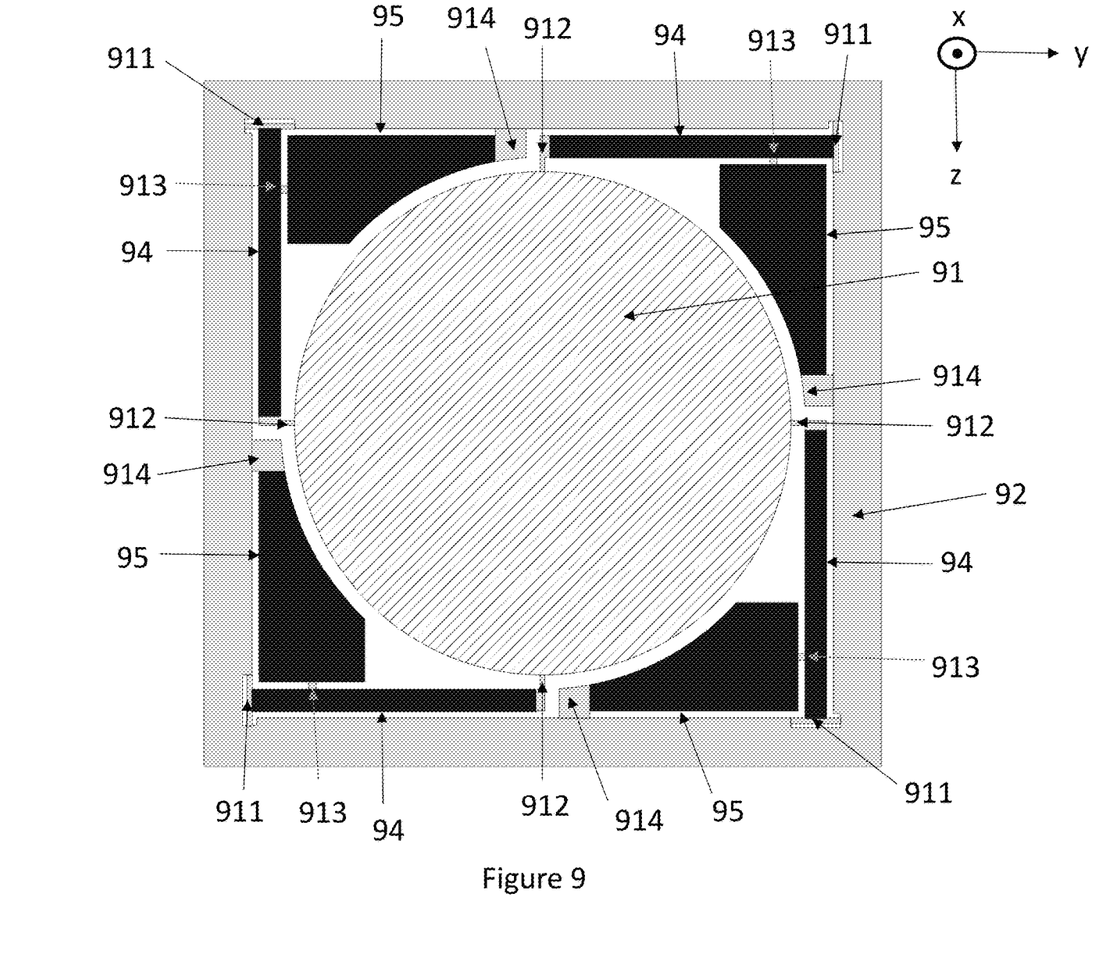
FIG. 9 illustrates a scanning MEMS reflector system according to a third embodiment.

An actuation system for a scanning MEMS reflector according to the third embodiment is illustrated in FIG. 9. It shows a circular reflector 91 surrounded by a frame 92. As in the second embodiment, the actuation system comprises four actuation units placed symmetrically around the edge of a circular reflector.

Each actuation unit comprises a suspender 94 and actuator 95. The suspenders 94 are located symmetrically around the reflector 91, as in the second embodiment. All fixing points and their placements are also identical to the second embodiment, as illustrated in FIG. 9. The reflector shown in FIG. 9 therefore oscillates in wobbling mode. The general considerations which concerned the structure and geometry of fixing points in the first embodiment apply to this third embodiment as well.

In contrast to the second embodiment, the suspender 94 is not a rigid lever in this third embodiment. It is instead a bending piezoelectric actuator. This is illustrated in FIG. 9 by patterning the suspenders 94 with the same colour as actuators 95. In this embodiment, each actuation unit therefore comprises two interconnected actuators 94 and 95. Actuators 94 also act as suspenders. Interconnected actuators can equally well be implemented in combination with the first embodiment. In other words, tilting mode oscillation can also be induced by four actuation units where each actuation unit comprises two interconnected actuators.

Figure 10:
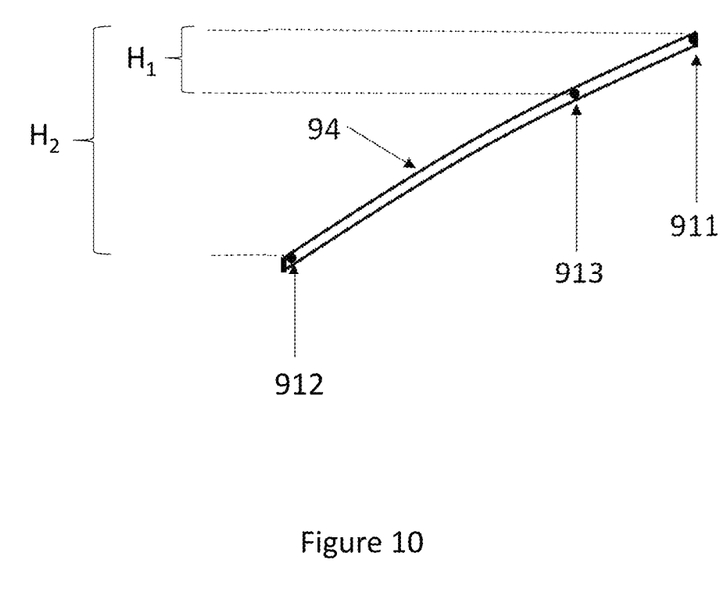
FIG. 10 illustrates the operating principle of the actuation unit in the third embodiment.

FIG. 10 illustrates the principle of mechanical amplification in this third embodiment. As before, one end of a bending piezoelectric actuator 95 (not shown in FIG. 10 but shown in FIG. 9) is attached to third fixing point 913. In response to an applied voltage, the actuator 95 bends in the same manner as in FIG. 4 and presses third fixing point 913 downward.

In this third embodiment the suspender 94 is itself a bending piezoelectric actuator which can be controlled with a voltage signal. Therefore, in addition to the mechanical amplification obtained when actuator 95 presses down third fixing point 913, an additional amplification of the actuation motion can be obtained by applying to actuator 94 a voltage which bends it even further downward. In the opposite phase of the actuation cycle, when actuator 95 lifts third fixing point 913 upward, actuator 95 can also be bent upward by the applied voltage. The actuation range $H_2$ is therefore further amplified by the bending of actuator 94.

As before, the third fixing point 913 can also in this third embodiment be located anywhere between first 911 and second 912 fixing points, and there is a trade-off between torque and actuation range. A longer distance between the first and third fixing points produces a greater torque but achieves a smaller actuation range.

Figure 11:
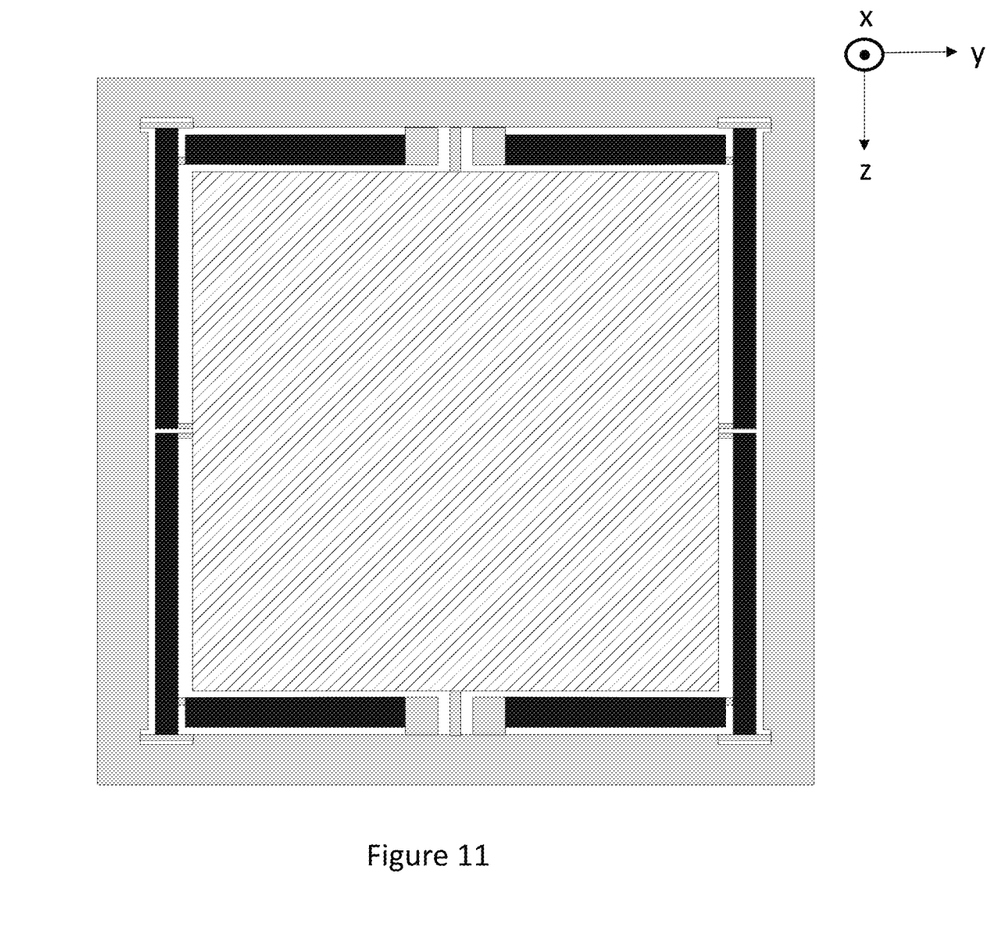
FIG. 11 illustrates a variant of the scanning MEMS reflector system according to the third embodiment.

The interconnected actuators of this third embodiment can also be implemented with a rectangular reflector, as illustrated in FIG. 11. All components shown in FIG. 11 correspond to the ones shown in FIG. 9. Only the shapes of the reflector and the actuators are different. As in the preceding embodiments, a rectangle-shaped reflector limits both the surface area of the actuators and the distance $L_1$, but its optical area is larger than that of a circular reflector.

Exemplary manufacturing methods for preparing a scanning MEMS reflector system according to any of the three embodiments presented above will now be described with reference to FIG. 12, which is a schematic cross-section of an exemplary scanning MEMS reflector device. The cross-section is schematic because some of the depicted components may in reality be located at different z-coordinates and may therefore not be present in the same xy-cross-section. For example, the z-coordinate of the electric contacts 124, 126 depends on where actuators are located on the z-axis.

The device comprises a cap wafer 1221 with electrical contact pads 1225, a SOI (Silicon on Insulator) structure wafer 1226 which comprises movable parts, and a glass cap wafer 1224 which provides an optical window for the mirror plate. The three wafers 1221, 1226 and 1224 are prepared separately and bonded to each other around the edges to form the reflector device. Together the wafers 1221, 1226 and 1224 form a cavity 129 where the reflector can oscillate.

The structure wafer 1226 comprises a device layer 1222, a buried oxide layer 1227 and a handle layer 1223. SOI wafers with this structure can be fabricated with well-known bonding and thinning techniques. The device layer 1222 can be prepared with lithography and silicon etching techniques well-known to a person skilled in the art. The etching technique is preferably deep reactive ion etching (DRIE). The device layer comprises a reflector with a silicon plate 128 and a reflective coating 1220. The coating can be formed on the plate with a thin-film deposition method such as vacuum evaporation or sputtering. The thickness of the device layer may be in the order of a few tens of µm, but it can be optimized according to need considering the desired reflector area, tilt angles and resonance frequency. SOI wafers are available at different device layer thicknesses ranging from a few µm to 100 µm or more.

The device layers also comprises suspenders and actuators. Two suspenders 127 aligned with the z-axis are shown in FIG. 12, in this case with piezoelectric layers 1230 on top. In embodiments where the suspender is merely a rigid lever, the piezoelectric layers are excluded. The location of the second fixing points 1212 of suspenders 127 are also indicated in FIG. 12. The connecting bridges which form the fixing points have not been drawn in FIG. 12. The first fixing points of suspenders 127 are not located in the same xy-plane as the second fixing points, but the location of the first fixing points in the background or foreground is nevertheless indicated in FIG. 12 with the numeral 1211. The two second fixing points 1212 indicated in FIG. 12 may in some embodiments not be located in the same xy-plane either, as explained above in relation to FIG. 3.

The cap wafer 1221 is a silicon wafer containing the electrical connections by which the reflector device can be operated. The wafer comprises contact pads 1225, a silicon substrate 123 with a recess for the cavity 129, and conductive vias 124. The conductive vias 124 may comprise doped single-crystal silicon which has been etched from the doped single-crystal silicon substrate 123 of the cap wafer 1221.

The conductive vias are surrounded by an insulating layer 125. The insulating layer 125 can for example be glass or silicon dioxide. The insulating layers 125 are formed with a suitable trench filling deposition processes after the conductive vias 124 have been etched. Trench filling processes include melting in the case of glass, and Chemical Vapor Deposition (CVD) or thermal oxidation of silicon in the case of silicon dioxide. Alternatively, the conductive vias 124 can be formed after deposition of the insulating layer 125 from doped polycrystalline silicon or metal using well know CVD or Physical Vapor Deposition (PVD) processes.

Lateral electric contacts 126 are formed on the device layer 1222 by thin-film deposition and patterning techniques such as evaporation or sputtering followed by optical lithography and etching. The lateral electric contacts 126 shown in FIG. 12 would extend to the piezoelectric actuators which are aligned with the y-axis in device layer 1222 (these actuators have been excluded from FIG. 12 for clarity). As already mentioned above, the cross-section depicted in FIG. 12 is only schematic and electric contacts 124, 126 may not in reality be located in the same xy-plane as, for example, second fixing points 1212. The conductive path between the conductive vias 124 in the cap wafer 1221 and the lateral contacts 126 in the device wafer 1222 is formed in the aligned wafer bonding of wafers 1221, 1226 and 1224.

As indicated in the introduction, the gas pressure within the cavity 129 may be lower than the gas pressure surrounding the device if resonance oscillation is sought. If the gas pressure within the cavity 129 should be lower than ambient pressure, the three wafers 1221, 1226 and 1224 may be bonded to each other hermetically in a chamber where the pressure has been set lower than ambient, corresponding to the desired cavity pressure.

The invention claimed is:

1. A scanning microelectromechanical reflector system comprising a reflector and at least one actuation unit and a frame which surrounds the reflector and the at least one actuation unit, wherein each actuation unit comprises an actuator and a suspender, wherein the suspender is fixed from a first fixing point to the frame, from a second fixing point to the reflector and from a third fixing point to the actuator, and wherein a projection of the third fixing point lies between the first fixing point and the second fixing point onto a line extending through the first fixing point and the second fixing point, and the actuator is configured to apply a torque on the suspender about an axis which:
   passes through the first fixing point,
   lies in the plane defined by the frame, and
   is perpendicular to the suspender; and
   the actuator is a bending piezoelectric actuator which is fixed from a fourth fixing point to the frame.

2. The scanning microelectromechanical reflector system according to claim 1, wherein the suspender comprises a first silicon beam, and
   the actuator comprises a second silicon beam coated with at least one electrode layer and at least one piezoelectric material.

3. The scanning microelectromechanical reflector system according to claim 2, wherein the first silicon beam in the suspender is also coated with at least one electrode layer and at least one piezoelectric material.

4. The scanning microelectromechanical reflector system according to claim 1, wherein the reflector is a silicon plate with a reflective coating.

5. The scanning microelectromechanical reflector system according to claim 1, wherein the reflector has a circular shape.

6. The scanning microelectromechanical reflector system according to claim 1, wherein the reflector has a rectangular shape.

7. The scanning microelectromechanical reflector system according to claim 1, wherein the frame has a rectangular shape.

8. The scanning microelectromechanical reflector system according to claim 1, wherein a first pair of opposing edges of the reflector is fixed to the frame from a torsion beam and at least one other part of the edge is fixed to a first actuation unit of the at least one actuation units.

9. The scanning microelectromechanical reflector system according to claim 8, wherein a second pair of opposing edges of the reflector is fixed to the frame from the first actuation unit and a second actuation unit of the at least one actuation units.

10. The scanning microelectromechanical reflector system according to claim 9, wherein the first actuation unit and the second actuation unit each comprising a piezoelectric material, and the piezoelectric material in the first actuation unit has a first polarity and the piezoelectric material in the second actuation unit has a second polarity, wherein the first polarity and the second polarity are equal.

11. The scanning microelectromechanical reflector system according to claim 9, wherein the first actuation unit and the second actuation unit each comprising a piezoelectric material, and the piezoelectric material in the first actuation unit has a first polarity and the piezoelectric material in the second actuation unit has a second polarity, wherein the first polarity and the second polarity are opposite.

12. The scanning microelectromechanical reflector system according to claim 1, wherein the reflector is fixed to at least three actuation units of the at least one actuation units at fixing points placed apart from each other on the edge of the reflector.

13. The scanning microelectromechanical reflector system according to claim 12, wherein the reflector is fixed to four actuation units of the at least three actuation units, placed symmetrically around the edge of the reflector.

14. A light-detecting and ranging (LIDAR) device, wherein the device comprises a scanning microelectromechanical reflector system according to claim 1.

15. The scanning microelectromechanical reflector system according to claim 10, wherein the first and second actuation units fixed to opposing edges of the reflector are driven with two separate voltage signals with opposite polarity.

16. The scanning microelectromechanical reflector system according to claim 11, wherein the first actuation unit is driven by a first voltage signal, and the second actuation unit is driven by a second voltage signal, wherein the first voltage signal and the second voltage signal are the same.

17. The scanning microelectromechanical reflector system according to claim 13, wherein the four actuation units are each driven with a separate voltage signal comprising:
   a first voltage signal comprising a first phase,
   a second voltage signal comprising a second phase,
   a third voltage signal comprising a third phase,
   a fourth voltage signal comprising a fourth phase, and
   wherein the first phase is separated from the second phase by a 90 degree phase shift, the first phase is separated from the third phase by a 180 degree phase shift, the first phase is separated from the fourth phase by a 270 degree phase shift.

* * * * *